3,217,032
PREPARATION OF VINYL ESTERS
Kasao Taka, Toyonaka, Japan, assignor to Kurashiki Rayon Co., Ltd., Okayama, Japan, a corporation of Japan
No Drawing. Filed Jan. 16, 1961, Ser. No. 82,700
Claims priority, application Japan, Jan. 21, 1960, 35/1,535; July 19, 1960, 35/31,560
5 Claims. (Cl. 260—498)

This invention relates to the preparation of vinyl esters and is more particularly concerned with the vinylation of acids such as carboxylic acids and hydrogen chloride.

It is known that activated carbon or activated carbon impregnated with various salts can be used as a catalyst for the vinylation of carboxylic acids and hydrogen chloride by reaction with acetylene. For example, the reaction between acetylene and a carboxylic acid to form esters of vinyl alcohol is described in Herrmann U.S. Patent 1,822,525 of September 8, 1931, and in Gehrke U.S. Patent 2,485,044 of October 18, 1949. Similarly, the production of vinyl chloride by the reaction of acetylene upon hydrogen chloride using an activated carbon is described in Dornte U.S. Patent 2,328,430 of August 31, 1943. The preparation of vinyl esters in general from acetylene and the corresponding acid is described in Hanszen et al. U.S. Patent 2,750,410 of June 12, 1956.

The speed of reaction in these prior processes, however, is not as high as generally desirable for industrial operation and increasing the rate of reaction has been a continuing problem. Various special catalysts have been proposed with this goal in mind, but results obtained to date still fall short of the desired rates.

It is accordingly an object of the present invention to provide an improved process for the vinylation of acids.

It is a further object of the invention to provide a process of the character indicated which is characterized by high reaction rates.

In accordance with the invention, vinylation of acids is effected by bringing acetylene and the acid to be vinylated together in the vapor-phase in the presence of a catalyst comprising an activated carbon which has been exposed to radiation. Most advantageously, the irradiated activated carbon is impregnated with at least one compound, e.g. a salt or oxide, of a metal of Group II, more particularly Group IIB, of the Periodic Table. Examples of suitable compounds are zinc acetate, zinc formate, zinc propionate, zinc chloride, zinc oxide, cadmium acetate, mercuric acetate, mercuric chloride, and the like.

The term radiation is used herein to signify high energy radiation, e.g. high-voltage electrons generated by any suitable source, such as natural or artificial radioactive isotopes, e.g. gamma-rays from cobalt 60 or other gamma-ray emitting radioisotopes or fission products, or high energy electrons from a Van de Graaff or other electron accelerator, hydrogen ion rays, heavy hydrogen ion rays, neutron rays, X-rays, and the like. Typical suitable sources of high energy radiation by means of which the activated carbon is advantageously irradiated are described, for example, in Rainer et al. U.S. Patent 2,878,-174 of March 17, 1959. The quantity or dose of irradiation to which the activated carbon is exposed for the purposes of this invention is $10^4$ to $10^{10}$ r.e.p., and $10^6$ to $10^8$ r.e.p. is preferred.

The invention will be further understood from the following specific examples of practical application. However, it will be understood that these examples are not to be construed as limiting the scope of the present invention in any manner. In these examples, all parts are by weight, unless otherwise indicated.

EXAMPLE 1

Commercial activated carbon of the type used for vinylation was irradiated with gamma-rays from cobalt 60 and other portions of this activated carbon were irradiated with electron rays from a Van de Graaff accelerator. The irradiated carbon was then immersed for 24 hours in an aqueous solution of 165 g./l. of zinc acetate at room temperature, and the thus impregnated irradiated activated carbon was then dried. These catalyst samples, along with non-irradiated activated carbon were exposed to acetylene at 185° C. in constant volume and the rate constant K for acetylene adsorption was measured. The pertinent data and the then exposed results are tabulated below:

*Table 1*

| Method of treatment of activated carbon | Irradiation dose (R.E.P.) | Zinc acetate adsorbed, g./g. | Rate constant of acetylene adsorption, K. |
|---|---|---|---|
| Untreated | | 0.2256 | $2.57 \times 10^{-3}$ |
| Gamma-ray from cobalt 60 | $1.7 \times 10^7$ | 0.3824 | $3.32 \times 10^{-3}$ |
| Electron ray from Van de Graaff accelerator | $1 \times 10^7$ | 0.3123 | $2.99 \times 10^{-3}$ |
| Do | $1 \times 10^8$ | 0.3326 | $2.82 \times 10^{-3}$ |

EXAMPLE 2

Activated carbon of the type commercially available for vinyl synthesis, as used in Example 1, was irradiated with gamma-rays from cobalt 60, was impregnated with zinc acetate by immersion in an aqueous solution of 350 g./l. zinc acetate at room temperature for a day, then dried. The thus prepared catalyst was then used for the vapor-phase synthesis of vinyl acetate from acetylene and acetic acid. For purposes of comparison, the original activated carbon not subjected to irradiation was also employed as catalyst for this reaction. The pertinent data and results are shown in the following table:

*Table 2*

| Activated Carbon Catalyst | Reaction Temperature, °C. | Space velocity, l. gas/l. catalyst/hr. | $C_2H_2$/acetic acid, mol ratio | Rate of Conversion of acetic acid, percent | Space time yield, kg. vinyl acetate/l. catalyst/day |
|---|---|---|---|---|---|
| Without irradiation | 194.6 | 275 | 2.48 | 32.2 | 1.73 |
| Do | 194.5 | 275 | 2.49 | 28.7 | 1.57 |
| Irradiated with $2.5 \times 10^7$ R.E.P. | 195.6 | 267 | 2.76 | 30.7 | 2.10 |
| Do | 195.6 | 263 | 2.91 | 33.5 | 2.19 |
| Irradiated with $5 \times 10^7$ R.E.P. | 194.3 | 266 | 2.79 | 39.1 | 2.53 |
| Do | 194.1 | 264 | 2.84 | 39.1 | 2.46 |

EXAMPLE 3

Commercially-available activated carbon suitable for vinylation, as employed in Examples 1 and 2, was used as catalyst for the vapor-phase synthesis of vinyl propionate from acetylene and propionic acid, after irradiation with gamma-rays from cobalt 60, and impregnation with zinc propionate by immersion in an aqueous solution of 150 g./l. zinc propionate at room temperature for a day followed by drying. A comparative test was made with the original activated carbon. The pertinent data are set forth below:

*Table 3*

| Activated Carbon Catalyst | Reaction Temperature, ° C. | Space velocity, l. gas/l. catalyst/hr. | $C_2H_2$/propionic acid, mol ratio | Rate of Conversion of propionic acid, percent | Space time yield, kg. vinyl propionate/l. catalyst/day |
|---|---|---|---|---|---|
| Without irradiation | 198.7 | 325 | 2.61 | 6.83 | 0.70 |
| Irradiated with $1 \times 10^7$ R.E.P | 197.0 | 325 | 2.61 | 7.54 | 0.77 |

EXAMPLE 4

Activated carbon as used in the preceding examples was employed as catalyst for the vapor-phase synthesis of vinyl chloride from hydrogen chloride and acetylene, after irradiation with gamma-rays from cobalt 60 and impregnation with mercuric chloride by treatment in an aqueous solution of 20 g./l. mercuric chloride at room temperature for 8 hrs., followed by drying. Non-irradiated activated carbon was also employed in a companion run. The results are tabulated in the following table.

*Table 4*

| Activated Carbon Catalyst | Reaction Temperature, ° C. | Space velocity, l. gas/l. catalyst/hr. | $HCl/C_2H_2$, mol ratio | Rate of Conversion of HCl, percent | Space time yield, kg. vinyl chloride/l. catalyst/day |
|---|---|---|---|---|---|
| Without irradiation | 164.4 | 980 | 1.1 | 2.6 | 0.96 |
| Irradiated with $1 \times 10^7$ R.E.P | 138.9 | 980 | 1.1 | 22.7 | 8.16 |

It will be seen from the foregoing examples, that the activity of the activated carbon was greatly enhanced by the irradiation, resulting in an increase in the quantity of salt adsorbed, and resulting in an increase in the rate constant of actylene adsorption by the irradiated and impregnated activated carbon. Furthermore, the irradiated, impregnated activated carbon produced very excellent results in terms of the space-time-yield in the vapor-phase synthesis of vinyl esters in accordance with this invention.

This new result is a matter of substantial industrial importance. If, on the other hand, one chooses to operate without increasing the space-time-yield, then, the reaction temperature can be lowered, and the rate of catalyst replacement can be lowered in a fluidized and moving bed system.

In some cases, difficulty has been experienced in prior vinylation operations in achieving reaction equilibrium particularly when the gas velocity is increased or the temperature reduced. The process of this invention permits such equilibrium to be obtained even at very high gas velocities and at relatively low temperatures, providing a striking increase in terms of time and space. This is particularly apparent from Example 4. The reduction in reaction temperature possible reduces by-products formation and simplifies subsequent refining and use of the vinyl ester produced.

In general, as illustrated by the foregoing examples, the salt used as the impregnant is a salt of the acid which is to be vinylated, although other salts or compounds may be used if desired. Further, while the invention has been illustrated with specific reference to the vinylation of hydrogen chloride, acetic acid, and propionic acid, it is also fully applicable to the vinylation of other carboxylic acid, e.g. other lower-alkyl carboxylic acids.

In the foregoing, reference has been made particularly to irradiated activated carbon which has been impregnated with various compounds which serve as promoters or co-catalysts. It is within the scope of the invention, however, to employ irradiated activated carbon alone as the catalyst for vinylation reactions of the type described, viz. the reaction between acetylene and an acid such as hydrogen chloride or a carboxylic acid.

It will also be understood that, unless otherwise indicated, conventional apparatus units are suitably employed in carrying out the process of this invention, including conventional reactors adapted to contain a bed of fluidized catalyst or a moving catalyst bed.

Similarly, the conditions and relative relationships set forth above are those preferred in carrying out the process of the invention, but it will be understood that other conditions and relationships may be used within the scope of the invention.

It will also be understood that various changes and modifications may be made in the embodiments described above without departing from the scope of the invention as defined in the appended claims. It is intended, therefore, that all matter contained in the foregoing description shall be interpreted as illustrative only and not as limitative of the invention.

I claim:

1. A process for the production of vinyl esters by the vinylation of an acid selected from the group consisting of lower-alkyl mono carboxylic acids and hydrogen chloride which comprises the step of interacting said acid with acetylene in the presence of activated carbon which is first irradiated with high-energy radiation by a dose of $10^4$ to $10^{10}$ r.e.p., and then impregnated with a salt of a metal of Group IIB of the Periodic Table.

2. A process for the production of vinyl esters by the vinylation of an acid selected from the group consisting of lower-alkyl mono carboxylic acids and hydrogen chloride which comprises the step of interacting said acid with acetylene in the presence of activated carbon which is first irradiated with negatively-charged high-energy electron radiation, the dosage of said radiation being in the range of $10^4$ to $10^{10}$ r.e.p., and then impregnated with a salt of a metal of Group IIB of the Periodic Table.

3. A process for the production of vinyl acetate which comprises interacting acetic acid with acetylene in the presence of activated carbon which is first irradiated with high energy radiation by a dose of $10^4$ to $10^{10}$ r.e.p., and then impregnated with a salt of a metal of Group IIB of the Periodic Table.

4. A process for the production of vinyl chloride which comprises interacting hydrochloric acid with acetylene in the presence of activated carbon which is first irradiated with high energy radiation by a dose of $10^4$ to $10^{10}$ r.e.p., and then impregnated with a salt of a metal of Group IIB of the Periodic Table.

5. A process for the production of vinyl propionate which comprises interacting propionic acid with acetylene in the presence of activated carbon which is first irradiated with high energy radiation by a dose of $10^4$ to $10^{10}$ r.e.p., and then impregnated with a salt of a metal of Group IIB of the Periodic Table.

References Cited by the Examiner
UNITED STATES PATENTS

| | | | |
|---|---|---|---|
| 2,770,650 | 11/56 | Stanton | 260—498 |
| 2,779,805 | 1/57 | Millard | 260—498 |
| 2,955,997 | 10/60 | Allen | 204—154 X |
| 3,002,910 | 10/61 | Caffrey | 204—154 |
| 3,051,737 | 8/62 | Gibson | 204—154 X |

References Cited by the Applicant

Lange's Handbook of Chemistry, Eighth Edition (1952), page 1772.

"The Condensed Chemical Dictionary," New York, Reinhold Publishing Corporation, 1956, page 441.

LORRAINE A. WEINBERGER, *Primary Examiner.*

ABRAHAM A. WINKELSTEIN, TOBIAS E. LEVOW, LEON ZITVER, *Examiners.*